Nov. 11, 1941.  J. M. AVERY  2,261,946
PROCESS FOR SMELTING ORES
Filed March 10, 1939
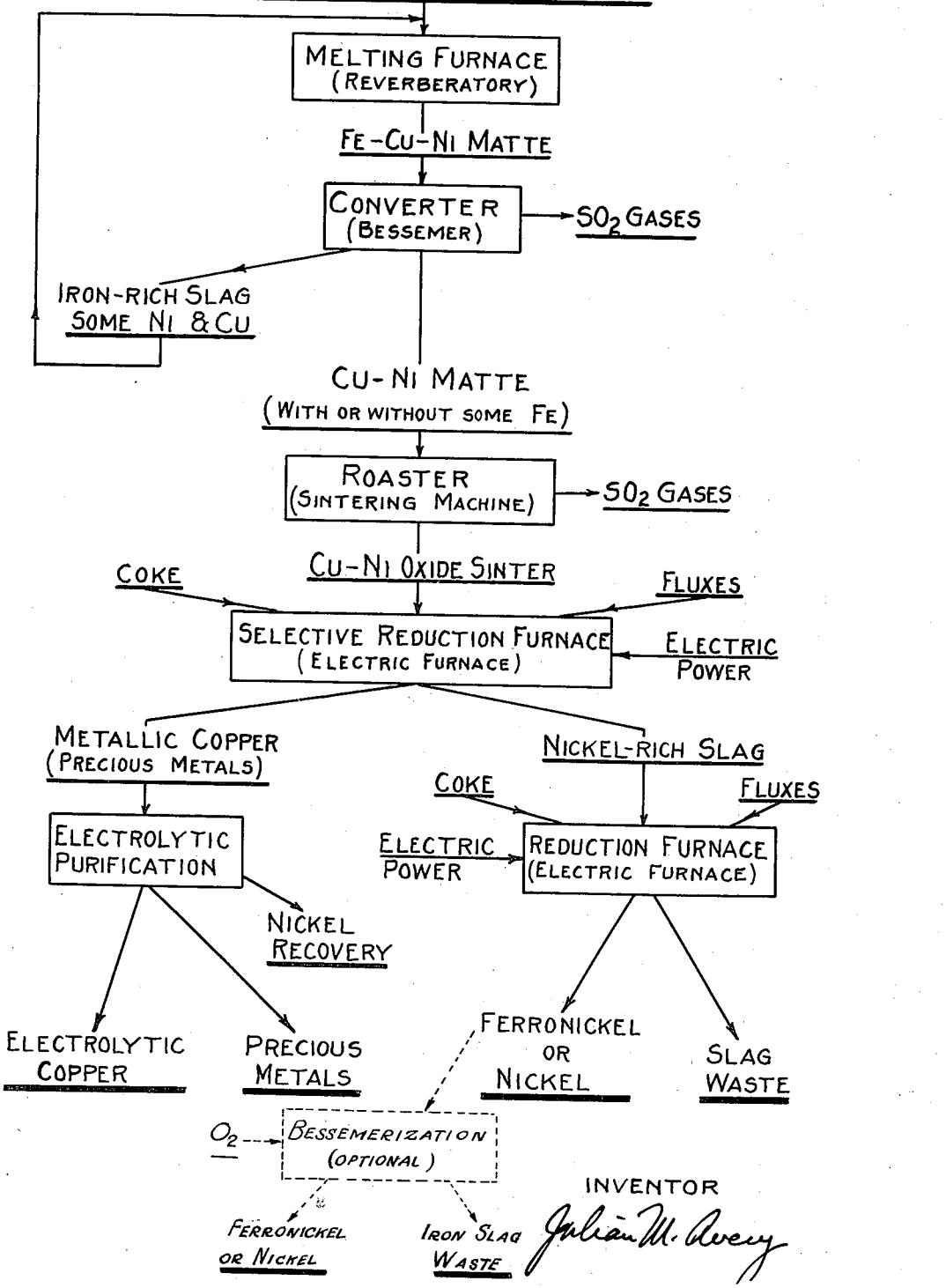

Patented Nov. 11, 1941

2,261,946

UNITED STATES PATENT OFFICE 2,261,946

PROCESS FOR SMELTING ORES

Julian M. Avery, Westport, Conn., assignor to Arthur D. Little, Incorporated, Cambridge, Mass., a corporation of Massachusetts Application March 10, 1939, Serial No. 261,019

7 Claims. (Cl. 75—10)

This invention relates to the smelting of metals from ores, and more particularly to the smelting of complex sulphide ores containing one or more metals of the iron group in association with one or more non-ferrous metals. While in its broader aspects the process of the invention may at least in part have other applications within this general field, it will be described in connection with a specific preferred application, namely, the smelting of copper-nickel-iron sulphide ores.

The principal known ores of nickel are complex sulphides containing copper, nickel, iron and sulphur in varying proportions, together with important proportions of precious metals such as gold and platinum. The problem of recovering copper, nickel and the precious metals separately from such ores presents great difficulties and involves an extended sequence of costly steps in even the simplest of the processes heretofore used in the treatment of such ores. For example, a method used on a large scale involves partially roasting sulphide concentrates; smelting the partially roasted concentrates in a blast furnace or a reverberatory furnace to slag off a substantial proportion of iron and produce a matte rich in copper, nickel and precious metals and relatively poor in irons; blowing this matte in a converter to remove some sulphur and most of the remaining iron; and treating the resultant low-iron matte in a two-step process with fluxes which, by exerting a "parting" action, separate the metallic sulphides into a copper-rich fraction containing some nickel, and a nickel-rich fraction containing considerable copper. Further steps include blowing the copper matte to metallic copper in a converter and purifying the resultant blister copper by electrolysis; and putting the nickel matte through an extended series of chemical and metallurgical treatments leading to the eventual recovery of metallic nickel. An important feature of such a process is the fact that in the steps whereby copper and nickel are separated, the precious metals tend in large part to follow the nickel, which necessitates electrolyzing the nickel if these precious metal values are to be recovered.

Other processes, such as the copper sulphate-nickel carbonyl process are used for treating such ores, but such processes likewise involve expensive treatments and are complicated by the inherent difficulty of separating copper, nickel and iron, and the desirability of recovering precious metal values. It has also been suggested that a molten slag-like product containing the oxides of iron, copper, nickel and the like, produced by oxidizing a mixed sulphide ore, might be selectively reduced by treatment with a controlled quantity of solid or gaseous reducing agent in a furnace of the converter type, to produce a metallic product containing most of the copper and more or less of the nickel or other metals, and a slag product containing most of the iron and some of the other metals. Selective reduction of molten mixed-oxide slag presents many practical difficulties and is not adapted to low cost production methods, and is therefore eschewed in the present invention.

The present invention provides a greatly simplified process which facilitates the separation of copper and nickel and the recovery of precious metals, and leads to the recovery of nickel in a form adapted for use in ferrous metallurgy, as in the manufacture of alloy steels and cast iron.

The advantages and method of practicing the invention will be apparent from the following description taken in conjunction with the attached drawing which represents a schematic flow sheet of the process as applied to a typical copper-nickel-iron sulphide ore.

In the practice of my invention in its preferred embodiment a matte rich in copper and nickel, with or without a substantial proportion of iron, is roasted to convert the sulphides of these metals substantially completely to oxides, and the mixed metallic oxides so obtained are subjected to a selective reduction smelting preferably in electric furnaces of the submerged arc-resistance type. In this first stage smelting, metallic copper usually containing some nickel will be recovered, together with a slag containing a major portion of the nickel and iron content of the original matte. In a second stage smelting, the nickel-rich slag product of the first stage may be smelted to metallic nickel or ferro nickel, leaving a slag substantially free of nickel. This second stage smelting may or may not be selective in character, depending upon the character of the slag produced in the first stage smelting, and the character of the product desired. If the second stage smelting is selective in character, it may advantageously be carried out in an electric furnace of the submerged arc-resistance type, in much the same manner as the first stage selective reduction. The precious metals, being much more readily reduced than copper, are concentrated completely into the copper product of the first stage smelting, and hence may be recovered completely in the normal course of electrolytic purification of the copper.

Such a process of selective induction has hitherto been thought not to be feasible in the case of copper and nickel. It is well known that attempts at selective reduction of copper from mixed oxides of copper and nickel, by means of hot reducing gases such as hydrogen and carbon monoxide, and in coke-fired cupolas, have not been successful. I have found, however, that by properly controlling the proportion of carbonaceous reducing agent in the charge, and by properly adjusting slag conditions to take advantage of the greater basicity of nickel oxide as compared with copper oxide, and by using low power densities, it is possible to reduce copper selectively from nickel and iron oxides in electric furnaces of the submerged arc-resistance type. However, because of the rather small difference in the reducibility of copper and nickel oxides, and because of the strong alloying tendency of copper and nickel, it is extremely difficult, if not impossible, to obtain a complete separation between copper and nickel in the first stage selective reduction, and for this reason it is usually necessary to reduce some nickel into the copper, or to leave some copper in the nickel-rich slag, or both. Nevertheless, by the exercise of suitable precautions as hereinafter set forth, the proportion of nickel reduced into the copper can be kept sufficiently low not to interfere seriously with the subsequent refining of the copper. On the other hand, such copper as may be left in the nickel-rich slag of the first stage smelting operation is necessarily reduced into the nickel product of the second stage smelting, but the proportion of copper so introduced is controllable, and may either be eliminated in the first stage or kept so low as not to prejudice the use of the nickel or ferronickel product for most purposes. Similarly, the separation of nickel from iron in the second stage smelting will usually be incomplete and in order to recover all of the nickel from the slag some iron will ordinarily be reduced into the nickel product if much iron is present in the original matte. But as a major portion of the world's nickel production is destined for use in ferrous alloys, this simple and economical method for producing nickel in the form of ferronickel is in fact one of the advantages of the process of the invention.

Since the process of the invention can in general be applied economically only to relatively rich raw materials, the concentration of the ore and the first smelting operation producing a high-iron matte are for the purpose of discussion assumed to be the same as in present methods of treatment. It should be noted, however, that the reverberatory furnace shown in the drawing may be replaced by an equivalent, such as a blast furnace or an electric furnace, for producing the first matte.

This first matte, in order to avoid wasting copper and nickel values, will in general contain more iron than is desirable in the process of the invention. For this reason it will usually be advantageous, though not essential, to remove at least a part of this iron by bessemerization, though it will in general not be desirable to remove all of the iron at this point. The optimum iron content at this point in the process of the invention will depend in part upon whether ferronickel or nickel is the desired nickel product, for if nickel is the desired product, then it will usually be desirable to remove practically all of the iron at this point, as in the present process. If, however, ferronickel is the desired product, the cost of this bessemerization step per ton of product recovered may be substantially decreased, and the quantity of slag returned to the matting furnace likewise decreased. This is in fact one of the indicated advantages of the process of the invention. It will also be apparent that if the matte from the matting furnace contains only the desired proportion of iron, the converter operation may be eliminated entirely from the process, with a consequent substantial saving in cost.

The roasting operation is preferably performed by means of sintering machines, in order that the product may have desirable physical characteristics. But it may alternatively be performed, if desired, in other types of roasting apparatus. Dead roasting the matte at this point in the process permits important economies in the recovery of sulphur by-products, as compared with the difficulties involved in collecting and treating sulphur-containing gases from various sources as in present processes.

Electric furnace smelting is especially advantageous where power is cheap and fuel is expensive which conditions generally prevail in localities where nickel ores are found. The electric furnace itself may be of any suitable design, so long as it conforms to the conditions hereinafter set forth. In order to obtain maximum selectivity in the electric furnace smelting operations I have found it desirable to avoid high concentrations of energy at the tip of the electrodes, to keep the electrodes well out of the molten bath of slag and metal, to provide a slag having a low melting point and low viscosity, and to control carefully the amount of carbonaceous reducing agent fed with the charge to substantially that proportion required to reduce to the metallic state only that portion of the oxide content of the charge which is desired to be reduced. The power density employed, measured in terms of the active cross section of the electrodes used, should in general be not greater than about 4 horsepower per square inch. Iron oxide is particularly advantageous as a slag ingredient, in order to lower its melting point and to increase its fluidity, but whether or not a substantial proportion of iron oxide is present in the slag it will be apparent that other fluxes such as silica, alumina, lime, magnesia and fluorspar may be used in accordance with principles well known to those skilled in the smelting art. In the first stage electric furnace smelting I find it advantageous to use an acid flux such as silica, and to avoid too basic a slag, in order to take advantage of the stronger basicity of nickel and iron oxides as compared with copper oxide.

The following description is illustrative of a typical embodiment of the invention as applied to the production of ferronickel.

One hundred units of a reverberatory matte of the approximate composition:

| | Per cent |
|---|---|
| Cu | 14 |
| Ni | 17 |
| Fe | 42 |
| S | 21 | may be blown in a converter to produce about 42 parts of matte of the approximate composition:

| | Per cent |
|---|---|
| Cu | 33 |
| Ni | 32 |
| Fe | 15 |
| S | 20 | and about 80 parts of high iron slag containing some nickel and copper a part of which may be returned to the matting furnace.

The low-iron matte so produced may be dead roasted on a sintering machine to produce about 41 parts of oxide sinter having the approximate composition as to metal content:

| | Per cent |
|---|---|
| Cu | 34 |
| Ni | 33 |
| Fe | 16 | which may be mixed with about

| | Parts |
|---|---|
| Silica | 15 |
| Coke | 1.4 | and smelted in an electric furnace of the submerged arc-resistance type (using for example about 6000 horsepower with three electrodes each about 770 square inches in active cross section) to produce about 14 parts of metal of the approximate composition:

| | Per cent |
|---|---|
| Cu | 95 |
| Ni | 4 |
| Fe | 1 | and about 41 parts of slag of the approximate composition:

| | Per cent |
|---|---|
| Ni | 32 |
| Fe | 16 |
| SiO$_2$ | 40 |

This slag may be mixed with about

| | Parts |
|---|---|
| Limestone | 36 |
| Coke | 4.1 | and smelted to produce about 18 parts of metal of the approximate composition:

| | Per cent |
|---|---|
| Ni | 75 |
| Fe | 25 | which is a satisfactory grade of ferronickel for use in ferrous metallurgy. This nickel product will usually contain some carbon and silicon which may, if necessary be removed to a desired degree as for example by bessemerization, and if desired its iron content may also be decreased by prolonging the bessemerization, preferably using oxygen-enriched blast.

The copper product obtained in the first smelting step will usually contain all of the precious metals of the charge, which will of course be recovered in the electrolytic refining operation. The indicated nickel and iron contents of the copper product are not sufficient to cause trouble in the electrolytic process, and the nickel is of course recoverable from the cell liquor. Alternatively, the nickel and iron content of the copper may be decreased by bessemerization, or by poling in accordance with well-known metallurgical practice.

In a modification of the process, a substantial proportion of sulphur may be left in the roasted matte used in the electric furnace operation, or sulphides may be introduced into the electric furnace charge if desired. Such a modification may be desirable, to increase the separation of copper from nickel in the slag, and to provide fuel for bessemerization in those variants of the process wherein the metallic copper product is bessemerized. This bessemerization step may be used with a fair degree of success, especially if oxygen-enriched blast is employed, for removing a small percentage of nickel or iron from the copper product, or of iron and carbon from the nickel product, the slag so formed being returned to the electric furnace smelting charge.

While the invention has been described in the form of a preferred embodiment as applied to the smelting of copper-nickel ores, modifications within the broad scope of the invention will be evident to those skilled in the art. It will likewise be apparent that the principle of separating readily reducible non-ferrous metals from metals of the iron group, i. e., iron, nickel, cobalt, by selective reduction of mixtures of oxides of such metals, may be applied to other ores or concentrates, as for example the separation of lead and/or copper from iron.

I claim:

1. Process for treating complex copper-nickel-iron sulphide ores which comprises forming a matte containing most of the metal values of the ores, roasting said matte, smelting the resultant mixed metal oxides by selective reduction in an electric furnace of the submerged arc-resistance type to produce metallic copper and a nickel-rich slag, and smelting said nickel-rich slag to produce ferronickel.

2. Method of separating copper and nickel from mixed oxides containing iron, copper and nickel which comprises subjecting said mixed oxides to a first step selective reduction smelting wherein metallic copper and a nickel-rich slag are formed, and then smelting said nickel-rich slag to produce ferronickel.

3. Process for the manufacture of ferronickel from complex copper-nickel-iron ores which comprises forming a matte containing most of the copper and nickel content of the ore, and some of its iron content; roasting said matte; subjecting the resultant mixed oxides to a selective reduction smelting wherein the copper contained in the charge is substantially completely reduced to metallic copper, and smelting the resultant nickel-iron slag to ferronickel.

4. Process for the manufacture of alloys of copper and nickel which comprises subjecting a mixture of copper, nickel and iron oxides to a selective reduction smelting whereby the copper and at least a portion of the nickel of the charge are substantially reduced to an alloy of copper and nickel, and most of the iron content and the balance of the nickel of the charge are retained in the slag, and then smelting said slag to ferronickel.

5. Process for the manufacture of nickel from complex copper-nickel-iron ores which comprises forming a matte containing most of the metal values of the ore, roasting said matte, subjecting the resultant mixed oxides to a selective reduction smelting whereby copper is substantially removed as metal, smelting the resultant nickel-rich slag to produce molten metal containing nickel and iron, and bessemerizing said metal to remove iron by oxidation down to a desired iron content.

6. In a process for the treatment of complex copper-nickel-iron ores, the sequence of steps which comprises roasting a matte thereof to produce principally oxides of copper, nickel, and iron, subjecting the resultant mixed oxides to a selective reduction smelting in an electric furnace of the submerged arc-resistance type whereby metallic copper and a nickel-rich slag are formed, and subjecting said nickel-rich slag to a second reduction smelting in an electric furnace of the submerged arc-resistance type, whereby ferronickel is produced.

7. Process for separating copper and nickel from mixed oxides, which comprises subjecting a mixture of copper, nickel, and iron oxides to a selective reduction smelting to produce metallic copper and a nickel-rich slag, smelting said slag to produce a metallic mixture consisting essentially of nickel and iron, and then bessemerizing said metallic mixture to remove iron down to a desired iron content.

JULIAN M. AVERY.